Sept. 20, 1966  I. S. HOUVENER ET AL  3,273,444
EXPANDABLE DOWEL

Filed March 6, 1964  2 Sheets-Sheet 1

INVENTORS.
Irving S. Houvener
Albert J. Palfey
BY
AGENT
ATTORNEY

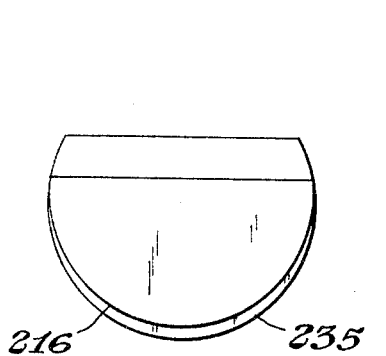
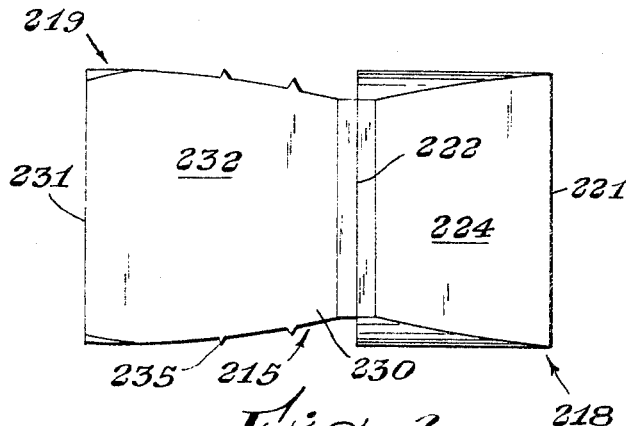
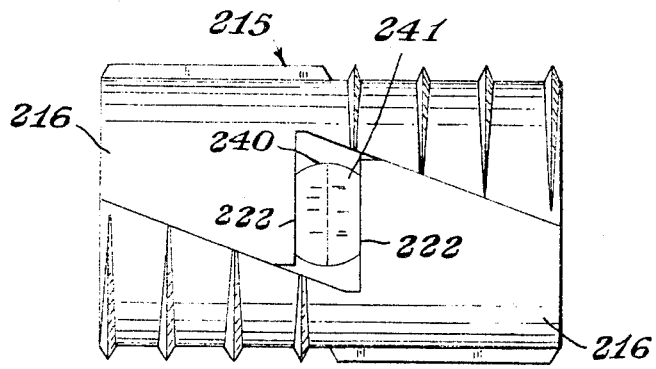
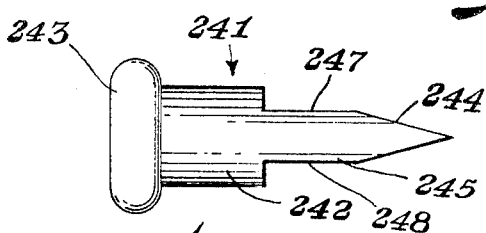
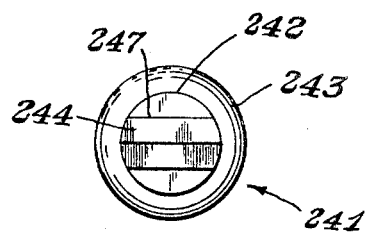
INVENTORS.
Irving S. Houvener
Albert J. Palfey
ATTORNEY

United States Patent Office 3,273,444
Patented Sept. 20, 1966

3,273,444
EXPANDABLE DOWEL
Irving S. Houvener and Albert J. Palfey, both of Midland, Mich., assignors to The Dow Chemical Company, Midland, Mich., a corporation of Delaware
Filed Mar. 6, 1964, Ser. No. 349,914
1 Claim. (Cl. 85—79)

This invention relates to dowels. It more particularly relates to radially expanding and longitudinally contracting dowels.

Many structures are fabricated from panels or other large sheet-like components of considerable thickness which desirably are joined together in edge to edge relationship. Oftentimes considerable difficulty is encountered in securing such panels in a closely mating configuration in a convenient and easy manner. Generally for maximum convenience in assembly any fastener which is employed should be actuated from a location at the face of the panel rather than at the edge portions thereof.

It is an object of this invention to provide an improved dowel particularly suited for use in joining large objects.

Another object of this invention is to provide an improved dowel which is expandable in a direction generally normal to its longitudinal axis and in effect contracts in a direction parallel to its longitudinal axis.

A further object of this invention is to provide a dowel which may be tightened to engage oppositely disposed cavities and draw the bodies together which form or define the cavities.

These benefits and other advantages in accordance with the invention are readily achieved by providing a dowel having a longitudinal axis and adapted to engage cavities formed in oppositely disposed bodies, the dowel having means to engage the walls of the cavities and being so constructed and arranged that when the means to engage the walls of the cavities are moved in a generally radial direction from the longitudinal axis of the dowel such means have a component of motion toward a plane generally normal to the longitudinal axis of the dowel and being disposed between said cavity engaging means, said dowel having means to alter the position of the wall engaging means actuatably from a direction generally normal to the longitudinal axis of the dowel.

Further features and advantages of the present invention will become more apparent from the following specification when taken in connection with the drawing wherein:

FIGURES 3 and 4 are two views of the portions of the dowel of FIGURE 1;

FIGURE 5 depicts the dowel of FIGURE 1 in the closed position;

FIGURES 6 and 7 are two views of the actuating pin utilized in FIGURE 5.

Figure 1:
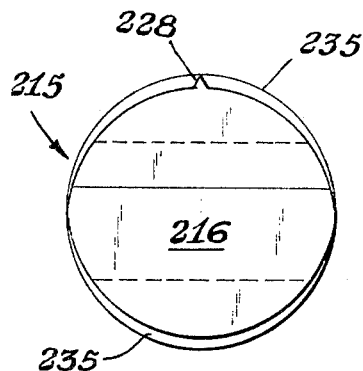
FIGURE 1 is a plan view of a dowel in accordance with the invention.
Figure 2:
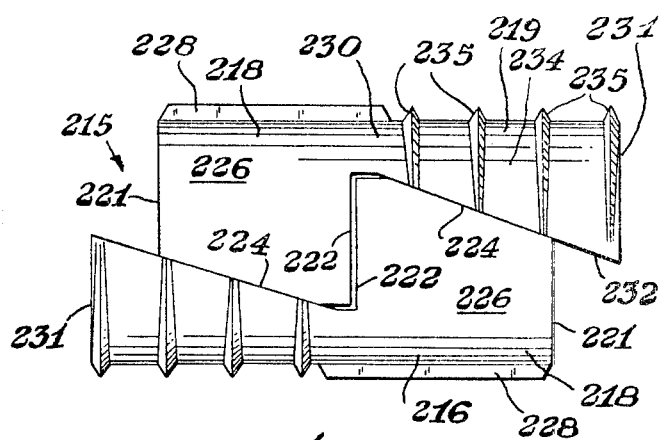
FIGURE 2 is an end view of the dowel of FIGURE 1.

In FIGURES 1 and 2 there is illustrated a dowel in accordance with the invention designated by the reference numeral 215. The dowel 215 comprises a pair of like body portions 216. Each of the body portions are assembled in mating relationship to form a generally cylindrical configuration. Each body portion 216 comprises a first wedge shaped section 218 and a second wedge shaped section 219. The wedge shaped section 218 has a toe 221 and a head 222 and a wedging face 224. The portion 218 has generally cylindrical surface 226 oppositely disposed from the wedging surface 224 and lying on the cylindrical surface 226 is a generally longitudinal rib 228. The wedge portion 219 is rigidly attached to the wedge portion 218 by means of a toe portion 230 which is secured to the head portion 222 of the portion 218. A wedge portion 219 comprises a head 231, a wedging surface 232 and a generally cylindrical surface 234. Disposed in a generally circumferential manner on the cylindrical surface 234 are a plurality of ribs 235.

Two views of a portion 216 are shown in FIGURES 3 and 4.

In FIGURE 5 there is depicted a view of a dowel 215 in the closed and locked position. The two body portions 216 have been moved to form a centrally disposed space 240 between the head portions 222. Within the space 240 is a key or wedge 241.

FIGURES 6 and 7 depict a side and end view of the wedge or key 241 which comprises a body 242 and a head 243, a wedge portion 244 remotely disposed from the head 243, and separated from the body 242 by means of the spacer 245 having flat surfaces 247 and 248. In operation of the embodiment depicted in FIGURES 1–7 the dowel is inserted in the suitable apertures in the bodies to be joined when the two dowel portions are placed together in the manner illustrated in FIGURE 1, that is, with the heads of the wedge portions 218 in closely adjacent relationship. When in this position the overall cross sectional dimension of the pin is substantially less than that of the cross sectional dimension when locating as shown in FIGURE 5. When the two portions to be joined are in abutting relationship with the dowel 215 in position the locking pin or key 241 is inserted between the head portions 222 and the key 241 is forced into the assembly to form the space 240 thus causing the two body portions 216 to in effect form a dowel having a diameter greater and a lesser length than the original assembly. This effectively secures the two portions being joined in a permanent manner and serves to draw them together and provide a tight joint. Advantageously the longitudinal rib 228 induces considerable stability to the pin when positioned in cavities with yieldable walls and effectively retards any tendency for rotation and twisting as the key 241 is driven into position.

The dowel of the present invention is particularly advantageous for permanent installation as it is of extremely simple construction readily adapted to rapid assembly having only two different parts, two like body portions 216 and the pin or key 241. Usually a single blow of a hammer is sufficient to lock the dowel permanently in position.

As is apparent from the foregoing specification, the manufacture of the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claim.

What is claimed is:

A radially expandable longitudinally contractable dowel having a generally cylindrical configuration, the dowel comprising:

two solid body portions, each of said body portions comprising
a first wedge and
a second wedge, the toe of the first wedge being rigidly affixed to the head of the second wedge, the first wedge and the second wedge having generally planar spaced apart inclined wedging surfaces lying in generally parallel planes on one side of the body portion, the remaining side of the body portion having a generally cylindrical surface,
at least one circumferentially disposed cavity engaging rib extending from a generally cylindrical surface of the first wedge of the body portion, a longitudinal rib member is disposed on a generally cylindrical side of the second wedge, said head portion on each said body portion being a substantially centrally located flat planar surface transversely disposed relative to the longitudinal axis of the dowel and facing toward said inclined wedging surface of said second wedge of its respective body portion, said inclined wedging surface of each of said first wedges defining with said cylindrical surface thereof a radial dimension which decreases from a maximum adjacent said head portion to a minimum at the outer end of said first wedge, said inclined surface of each of said second wedges defining with said cylindrical surface thereof a radial dimension which increases from a minimum adjacent said head portion to a maximum at the outer end of said second wedge, each of the body portions being arranged with the wedging surface of the first wedge adjacent the wedging surface of the second wedge of the opposite body portion, the heads of the second wedge portions being adjacent and facing each other, the toe of the second wedge of each of the body portions being disposed adjacent the head of the first wedge of the other body portion, a key comprising a head, a wedging portion having a wedging surface remotely disposed from the head, a spacer having at least one flat surface disposed between the head and the wedging portion, an edge of the flat surface of the spacer being contiguous with an edge of the wedging surface of the spacer and being of constant width in a direction normal to the flat surface, the wedging surface adapted to engage the head of the second wedge of each body portion and extending generally transversely from the dowel movement of the key, thereby forcing the first wedges of each of the body portions closer together and increasing the diameter of the dowel in at least one direction.

References Cited by the Examiner

UNITED STATES PATENTS

| | | | |
|---|---|---|---|
| 987,381 | 3/1911 | Law | 85—79 |
| 1,288,786 | 12/1918 | Wilschewski | 85—67 |
| 1,459,542 | 6/1923 | McCathron | 85—66 |
| 1,960,405 | 5/1934 | Amor | 287—127 |
| 2,004,480 | 6/1935 | Pleister et al. | 85—79 |
| 2,192,048 | 2/1940 | Mueller | 287—127 |
| 2,362,969 | 11/1944 | Boelter | 85—79 |
| 3,014,399 | 12/1961 | Schaffner | 85—66 |
| 3,132,555 | 5/1964 | Casella | 85—66 |

FOREIGN PATENTS

| | | |
|---|---|---|
| 1,191,515 | 4/1959 | France. |
| 551,720 | 6/1932 | Germany. |
| 553,147 | 5/1943 | Great Britain. |
| 609,658 | 10/1948 | Great Britain. |
| 686,249 | 1/1953 | Great Britain. |

CARL W. TOMLIN, *Primary Examiner.*

M. PARSONS, JR., *Assistant Examiner.*